United States Patent Office 2,895,866
Patented July 21, 1959

2,895,866

LAMINATED STRUCTURES, COMPOSITIONS FOR PRODUCING SAME AND PROCESSES OF EMPLOYING SUCH COMPOSITIONS

William F. Amon, Jr., Kirkwood, Mo., and Finn Claudi-Magnussen, Kenmore, N.Y., assignors to General Aniline & Film Corporation, New York, N.Y., a corporation of Delaware No Drawing. Application May 22, 1956
Serial No. 586,387

16 Claims. (Cl. 154—139)

This invention relates to new and useful compositions, particularly suitable for the production of laminated structures and specifically useful in the preparation of such structures, employing polymethyl α-chloracrylate as one of the lamina of said structures.

Polymethyl α-chloracrylate is an unusual and outstanding polymeric material possessing exceptional heat- and light-stability characteristics and, further, exhibiting excellent surface hardness characteristics. Additionally, this polymer, because of its extreme inertness and stability, exhibits practically no surface crazing in normal usage. Possessed of said admirable properties, one might expect this material to have achieved great prominence in the polymer field but because of its inertness and other properties not clearly understood, great difficulty has been experienced in effecting the successful lamination of pre-formed sheets and the like of this polymer to other surfaces.

It is therefore an object of this invention to provide a new and useful composition suitable for bonding pre-formed polymethyl α-chloracrylate sheets to other suitable surfaces, sheets and the like.

It is a further object of this invention to provide new processes for effecting the production of laminated structures involving at least one sheet or other pre-formed structure of polymethyl α-chloracrylate to a dissimilar surface.

It is a still further object of this invention to provide new and useful laminated structures comprising at least one pre-formed sheet or the like of polymethyl α-chloracrylate.

Other objects of this invention will appear as the description proceeds.

The novel compositions of this invention are used to pre-treat pre-formed sheets or the like of polymethyl α-chloracrylate whereby the resultant structure may then efficaciously and successfully be laminated to other surfaces which surfaces include polymeric materials, glass, metal and the like which are normally employed in the production of laminated structures and to which it has heretofore been extremely difficult to adhere sheets of polymethyl α-chloracrylate. The compositions which are employed in the processes of this invention and in the production of laminated structures of this invention comprise solutions of copolymers of vinyl alkyl ethers and maleic anhydride, in the specifically selected solvent, N,N-dimethyl formamide. The vinyl alkyl ethers suitable in the present invention include the lower alkyl ethers and in particular the vinyl methyl ether and vinyl ethyl ether. These copolymers are in general characterized by the formula:

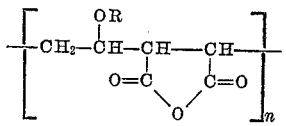

wherein R is a lower alkyl radical such as methyl, ethyl and the like, and $n$ has a value of at least 5. The copolymers which are operative in the instant invention are those having molecular weights from about 750 to several million or more. Viscosity measurements are commonly used as an indication of the average molecular weight of polymeric compositions. The copolymers which may be employed in the processes of this invention in general exhibit specific viscosities within the range of about 0.2 to 3. The specific viscosity is determined from a 1% solution of the polymeric material in 2-butanone at 25° C.

The general procedure for preparing the laminated structures of this invention comprises the treatment of the pre-formed polymethyl α-chloracrylate sheets or the like with a solution of the above described copolymers in N,N-dimethyl formamide. The resultant product is then dried at moderate temperatures, that is, at about 40 to 100° C. and preferably at about 70 to 90° C. and thereafter is exposed to ammonia vapors for a few seconds. The concentration of the copolymers in the aforementioned solution may vary and is not critical in the practice of this invention. It is possible to employ solutions having a concentration as low as 1% with the upper limit of concentration being the maximum solubility of the particular copolymer in the recited solvent. It is preferred, however, to employ in most instances solutions having a concentration of about 5 to 10% of the copolymer. Following the treatment as described above, the polymethyl α-chloracrylate is then ready for the laminating procedure. The latter is then conducted at elevated temperatures and while the composite structure is under pressure. After about 15 minutes the temperature is permitted to drop to about 60° C. before releasing the pressure on the composite structure. Suitable temperatures for effecting the desired laminations may range from about 70° C. to about 150° C. with a temperature of about 100° C. being preferred. The pressure to which the assembly is subjected during the laminating step may vary considerably and should be of the order of from about 1000 to 3000 pounds per square inch with a pressure of about 2000 pounds per square inch being preferred. As described above, before the pressure on the laminated assembly is released the temperature should be permitted to drop to below the temperatures employed during the laminating procedure, in other words, below about 70° C. The 60° C. temperature mentioned provides a safe margin during this procedure.

Among the specific materials to which polymethyl α-chloracrylate may successfully be laminated employing the compositions of this invention and the technique described herein are the following: polyvinyl butyral, polyvinyl chloride, polyvinyl acetate, copolymers of vinyl chloride and vinyl acetate, synthetic linear superpolyamides such as nylon made from hexamethylene diamine and adipic acid, methyl methacrylate, cellulose acetate, cellulose butyrate, and other similar polymeric materials, glass and metals such as iron, aluminum, copper, zinc and the like.

Among the types of structures which may be produced by the present invention are those in which a sheet of polymethyl α-chloracrylate is treated in the manner described above and laminated to a single dissimilar surface. It is also possible to employ two sheets of polymethyl α-chloracrylate, one surface of each having been treated in the manner described and laminate these to an intermediate surface. Again, it is also possible to employ a single sheet of polymethyl α-chloracrylate which has been treated on opposed surfaces in the manner described and then to each of said surfaces other dissimilar pre-formed sheets and the like may be adhered.

Example 1

One surface of each of two sheets of polymethyl α-chloracrylate are coated with a 10% solution of a copolymer of vinyl methyl ether and maleic anhydride in N,N-dimethyl formamide. The copolymer employed is one having a specific viscosity of 0.87. The coated sheets are dried at 80° C. and then exposed to ammonia vapors for 5 seconds. The two sheets are then assembled with a pre-formed sheet of polyvinyl butyral between them and with the coated surfaces in contact with the said polyvinyl butyral sheet. A pressure of about 2000 pounds per square inch is applied to the assembly placed between two press plates and the temperature is then raised to about 100° C. The temperature and pressure are maintained for about 15 minutes, after which the temperature is lowered to about 60° C., the pressure is then released and the laminated structure removed from the press plates. The result is a clear, strong colorless bond.

Example 2

A sheet of polymethyl α-chloroacrylate having a thickness of about 1/8 inch is coated on both sides thereof with a 5% solution of a copolymer of vinyl methyl ether and maleic anhydride in a N,N-dimethyl formamide. The copolymer employed is one having a specific viscosity of 0.6. The coated sheet is dried at 75° C. and exposed to ammonia vapors for about 3 minutes. An assembly is then prepared with the polymethyl α-chloracrylate sheet between two sheets of glass, and these placed between pressure plates; a pressure of about 1500 pounds per square inch is then applied to the assembly and the temperature raised to about 140° C. and maintained thereat for 20 minutes. Thereafter the temperature is permitted to drop to 50° C. after which the pressure is released and the resulting laminated structure removed from between the pressure plates. The resultant laminate is an excellent safety glass and exhibits a strong and colorless bond.

Example 3

A sheet of polymethyl α-chloracrylate of 1/4 inch thickness is coated on one surface thereof with a 10% solution of a copolymer of vinyl ethyl ether and maleic anhydride in N,N-dimethyl formamide. This copolymer is characterized by having a specific viscosity of 1.2. The coated product is dried at 90° C. and exposed to ammonia vapors for 6 seconds. To the coated side of this sheet there is applied a sheet of aluminum having a thickness of about 1/64 inch. This composite structure is placed between pressure plates and subjected to a pressure of about 2500 pounds per square inch at a temperature of about 125° C. for 10 minutes. Thereafter the assembly is permitted to cool down to 60° C., the pressure is then released and the laminated structure removed from between the pressure plates. An excellent bonding of the aluminum sheet to the polymer is obtained, whereby an outstanding lightweight structural material is achieved.

Example 4

The procedure of Example 1 is repeated employing in lieu of polyvinyl butyral a pre-formed sheet of polyvinyl chloride. The resultants obtained are comparable to those of that example.

Example 5

The procedure of Example 1 is again repeated employing a sheet of copper of 1/64 inch thickness in lieu of the polyvinyl butyral. The resultant structure exhibits outstanding strength at the bonds of three sheets. This material may be employed as a lightweight structural material and also for electrical uses.

Example 6

The procedure of Example 1 is again repeated except that a 5% solution of a copolymer of vinyl ethyl ether and maleic anhydride characterized by having a specific viscosity of 0.07 is employed for the copolymer described in that example. Clear, strong, colorless bonds result.

Example 7

The procedure for Example 2 is repeated except that a 10% solution of a copolymer of vinyl ethyl ether and maleic anhydride characterized by having a specific viscosity of 0.4 is employed in lieu of the copolymer of that example. Comparable results are achieved.

This invention has been disclosed with respect to certain preferred embodiments. Various modifications and variations of these embodiments will become apparent to those skilled in the art, and it is to be understood that such modifications and variations are to be included within the spirit and purview of this application and the scope of the appended claims.

We claim:

1. A process of laminating comprising applying a solution of a coplymer of a vinyl lower alkyl ether and maleic anhydride in N,N-dimethyl formamide to a polymethyl α-chloracrylate base, drying the coating, exposing the treated base to ammonia vapors, applying to the coated side of said coated base a pre-formed sheet and laminating the resulting assembly under heat and pressure.

2. A process for producing a laminated structure comprising applying to at least one surface of a polymethyl α-chloracrylate base a solution of a copolymer of a vinyl lower alkyl ether and maleic anhydride in N,N-dimethyl formamide, drying the coated base at an elevated temperature, exposing said dried and coated base to ammonia vapors and thereafter laminating said coated base to a dissimilar pre-formed lamina under pressure at an elevated temperature.

3. A process as defined in claim 1 wherein the vinyl ether is vinyl methyl ether.

4. A process as defined in claim 1 wherein the vinyl ether is vinyl ethyl ether.

5. A process as defined in claim 2 wherein the vinyl ether is vinyl methyl ether.

6. A process as defined in claim 2 wherein the vinyl ether is vinyl ethyl ether.

7. A process for producing a laminated structure comprising applying to at least one surface of a polymethyl α-chloroacrylate base a 1 to 10% solution of a copolymer of a vinyl lower alkyl ether with maleic anhydride in N,N-dimethyl formamide, drying the coated base at a temperature of about 40 to 100° C., exposing said dried and coated base to ammonia vapors and thereafter laminating said coated base to a pre-formed sheet under pressure at a temperature of at least about 70° C.

8. A process as defined in claim 7 wherein the vinyl lower alkyl ether is vinyl methyl ether.

9. A process as defined in claim 7 wherein the vinyl lower alkyl ether is vinyl ethyl ether.

10. A process as defined in claim 7 wherein the pre-formed sheet comprises polyvinyl butyral.

11. A process as defined in claim 7 wherein the pre-formed sheet comprises glass.

12. A process as defined in claim 7 wherein the pre-formed sheet comprises aluminum.

13. A process as defined in claim 7 wherein the pre-formed sheet comprises polyvinyl chloride.

14. The product produced by the process of claim 1.

15. The product produced by the process of claim 2.

16. The product produced by the process of claim 7.

(References on following page)

References Cited in the file of this patent

UNITED STATES PATENTS

| | | | |
|---|---|---|---|
| 1,751,220 | Shoji | Mar. 18, | 1930 |
| 2,213,763 | Gordon | Sept. 3, | 1940 |
| 2,318,959 | Muskat et al. | May 11, | 1943 |
| 2,325,947 | Garvey | Aug. 3, | 1943 |
| 2,519,764 | Jacobson | Aug. 22, | 1950 |
| 2,536,056 | Hempsel | Jan. 2, | 1951 |
| 2,562,641 | Saunders | July 31, | 1951 |
| 2,734,890 | Bortnick et al. | Feb. 14, | 1956 |
| 2,783,176 | Boicey | Feb. 26, | 1957 |
| 2,809,130 | Rappaport | Oct. 8, | 1957 |
| 2,825,672 | Koblitz et al. | Mar. 4, | 1958 |
| 2,855,387 | Barrett | Oct. 7, | 1958 |

FOREIGN PATENTS

| | | | |
|---|---|---|---|
| 540,940 | Great Britain | Nov. 6, | 1951 |